(12) United States Patent
Marks

(10) Patent No.: US 11,209,154 B2
(45) Date of Patent: Dec. 28, 2021

(54) ILLUMINATING FURNITURE PAD

(71) Applicant: Ron E Marks, Brooklyn, NY (US)

(72) Inventor: Ron E Marks, Brooklyn, NY (US)

(*) Notice: Subject to any disclaimer, the term of this patent is extended or adjusted under 35 U.S.C. 154(b) by 0 days.

(21) Appl. No.: 17/038,270

(22) Filed: Sep. 30, 2020

(65) Prior Publication Data

US 2021/0270456 A1 Sep. 2, 2021

Related U.S. Application Data

(63) Continuation of application No. 16/813,734, filed on Mar. 10, 2020, now abandoned.

(60) Provisional application No. 62/906,245, filed on Sep. 26, 2019.

(51) Int. Cl.
| | |
|---|---|
| *F21V 33/00* | (2006.01) |
| *H05B 47/11* | (2020.01) |
| *H05B 47/115* | (2020.01) |
| *F21Y 103/10* | (2016.01) |
| *F21Y 115/10* | (2016.01) |
| *F21Y 101/00* | (2016.01) |

(52) U.S. Cl.
CPC .......... *F21V 33/0012* (2013.01); *H05B 47/11* (2020.01); *H05B 47/115* (2020.01); *F21Y 2101/00* (2013.01); *F21Y 2103/10* (2016.08); *F21Y 2115/10* (2016.08)

(58) Field of Classification Search
CPC . F21V 33/0012; F21V 33/0004; H05B 47/11; H05B 47/115
See application file for complete search history.

(56) References Cited

U.S. PATENT DOCUMENTS

| | | | |
|---|---|---|---|
| 2006/0176697 A1* | 8/2006 | Arruda | F21V 23/0442 362/276 |
| 2010/0202156 A1* | 8/2010 | Wang | A47G 33/06 362/567 |
| 2016/0091185 A1* | 3/2016 | Soderholm | F21S 2/00 362/11 |
| 2018/0368572 A1* | 12/2018 | Amit | F21V 23/045 |
| 2019/0357691 A1* | 11/2019 | Rizzo | F21V 23/0471 |

* cited by examiner

*Primary Examiner* — Rajarshi Chakraborty
*Assistant Examiner* — Nathaniel J Lee
(74) *Attorney, Agent, or Firm* — Scott R. Hansen; Viking IP Law

(57) ABSTRACT

An illuminated pad for a furniture leg has a translucent outer layer that has exterior cushioning and a foam cushion layer. A string of LED lights is located in between the outer layer and the cushion layer. A power source is within the pad to power the lights. A sensor faces outwardly from outer layer, the sensor adapted to cause the lights to turn when at least one of low light level and motion are detected. The pad has portions of a securing mechanism adapted to secure the device about a leg of furniture. A soft inner surface faces a furniture leg when the device is secured about the leg. An access panel may be provided to reach the interior to charge or battery or to access other components.

20 Claims, 9 Drawing Sheets

ILLUMINATING FURNITURE PAD

BACKGROUND

It is common when manipulating furniture to inadvertently come in contact with a leg and/or foot of the furniture. For example, painful injury can result from hitting toes and feet on bed frame feet while making a bed, or just walking by the bed, particularly when there are sharp metal pieces and/or wheels attached to the furniture legs and/or feet. This is particularly true at night, when one awakes from sleeping and cannot see the furniture legs and/or feet, such as of a bed, in the dark.

A variety of coaster and furniture glides act as buffers between furniture legs/feet and the floor on which a piece of furniture rests. These devices focus on the placement of the coaster or glider on the terminal end of the furniture leg to prevent contact of the furniture leg with the floor and thus prevent damage to the floor or noises and vibrations as a result of contact of the leg with the floor.

Some devices further disclose extendable portions of the coaster or glider to aid positioning onto the furniture leg thus preventing disengagement of the coaster or glider while the furniture is in use. By way of example, a self-adjusting furniture guide with a sleeve to mount on to the terminal end of a furniture leg. In this example the sleeve snugly fits the furniture leg to keep the glider in position on the leg. While functional for its intended purpose, it has certain limitations, in particular the sleeve lacks padding to cover the furniture leg thus it does not protect a user from having injurious contact with the furniture legs/feet. Furniture glides and/or coasters fail to provide padding around the furniture leg/feet to prevent contact and injury to a furniture user.

SUMMARY OF THE INVENTION

In one embodiment, an illuminated pad for a furniture leg has a translucent outer layer that has exterior cushioning and a foam cushion layer. A string of LED lights is located in between the outer layer and the cushion layer. A power source is within the pad to power the lights. A sensor faces outwardly from outer layer, the sensor adapted to cause the lights to turn when at least one of low light level and motion are detected. The pad has portions of a securing mechanism adapted to secure the device about a leg of furniture. A soft inner surface faces a furniture leg when the device is secured about the leg.

Embodiments may have one or more additional features, either alone or in combinations with others. For example, the power source may be a battery, either rechargeable or non-rechargeable. Alternatively, the power source may be provided externally, such as plugging a power unit into an outlet. The sensor may be a light sensor, a motion sensor, or both. The securing mechanism may include hook and loop material, buttons and corresponding slits, adhesive, exterior bands or belt, or any of a number of suitable securing methods. The lights may be adapted to flash when lit, either in regular intervals or in a programmed sequence. The pad may include electronics to connect with a wireless network, such as a local area network via Wi-Fi. The pad may also include electronics adapted for the lights to be controlled remotely. The exterior cushioning may be foam, thick material, an inflatable bladder filled with a glass or liquid, a rubber-like material, fur, etc., and may be provided as a sheet or may be integral to the outer layer.

In another embodiment, an illuminated pad for a furniture leg, the pad has a translucent outer layer and a cushion layer. Lights are housed in between the outer layer and the cushion layer. A power source is interconnected to the lights to power the lights. A sensor faces outwardly, the sensor adapted to cause the lights to illuminate when at least one of low light level and motion are detected. The pad has a securing mechanism on each end of the pad, the securing mechanism adapted to secure the device about a leg of furniture. The pad has an inner surface that is suitable for facing a furniture leg when device is secured about the leg, without damaging the finish of the furniture. This embodiments may have any of the features in the foregoing paragraphs, either individually or in various combinations with one another.

In another embodiment, an illuminated pad for a furniture leg has an outer layer and a cushion layer. The pad also has at least one light and a power source interconnected to illuminate the at least one light, which illuminates the outer layer when power is provided to the light. The pad has a sensor that causes the at least one light to illuminate when at least one of low light level and motion are detected, or when another condition occurs for which the sensor is designed to detect. The pad has a securing mechanism adapted to secure the device about a leg of furniture. The pad also has an inner surface adapted to face a furniture leg when device is secured about the leg. The pad can be laid out flat when it is not secured about the leg, and takes a generally cylindrical configuration or other configuration suitable for the particular leg of furniture, when it is secured about the leg.

DETAILED DESCRIPTION OF A PREFERRED EMBODIMENT

Figure 1:
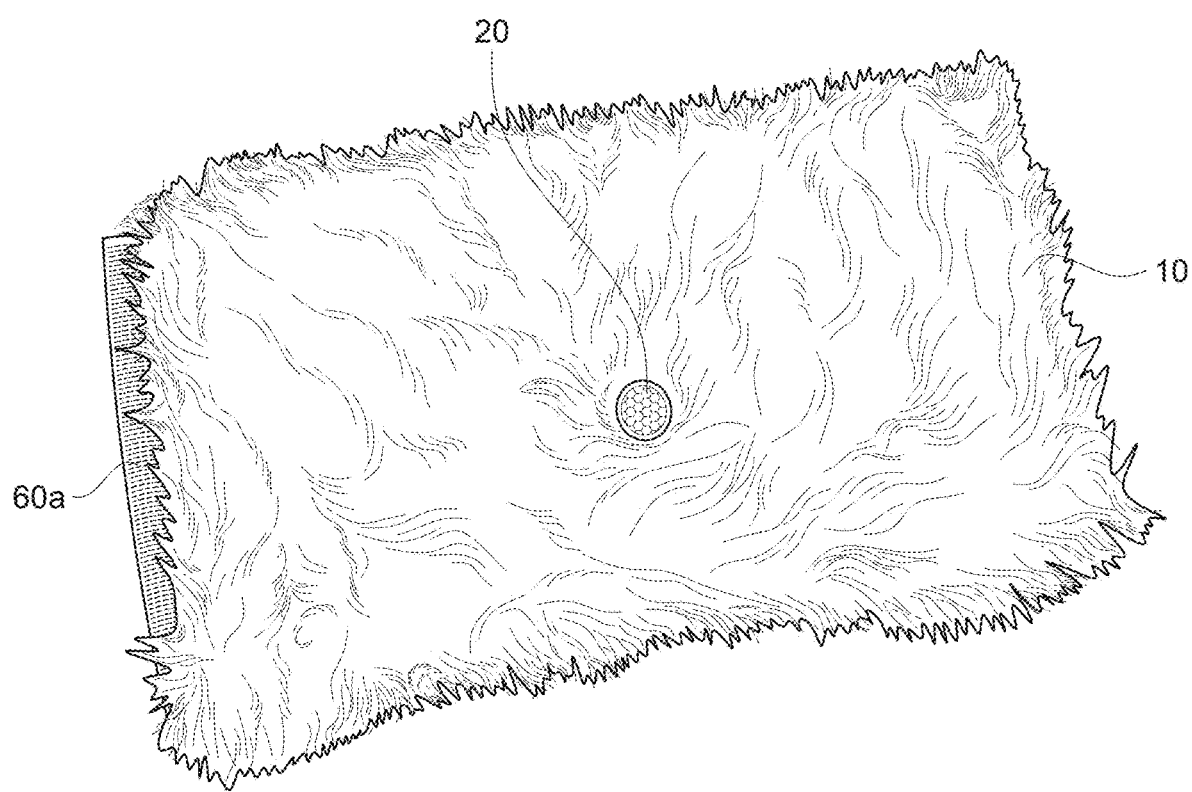
FIG. 1 illustrates an outwardly-facing surface of one embodiment of the present invention.

In a preferred embodiment, a protective sleeve/cover is a pre-manufactured, low cost, foam padded cover that can fit over and/or around the foot/leg of furniture to protect a furniture user's feet and toes from injury when coming in contact with the furniture leg/foot.

Common residential uses of the sleeve/cover include, but are not limited to, placement on the feet of: metal or wood bed frames, metal storage racks, cribs, free standing chopping blocks, dining tables, coffee tables, couches, and the like. For example, in use the protective sleeve/cover can prevent injury resulting from toes and feet bumping into a bed frame foot while making a bed, vacuuming around the bed, or just walking around the bed to get in it. Commercial uses include, but are not limited, to use in restaurants, retail establishments, healthcare facilities, daycare facilities, and retirements homes where any table, baking rack, free-standing chopping block, display rack, hospital birthing bed, child's bed/crib, or hospital bed.

In a preferred embodiment the pad portion may be polyurethane, foam, rubber, gel, and/or polymer. Some exemplary materials include, but not limited to, polyethylene foams, polyester foam, vinyl nitrile foams, rubber, and the like, such that it absorbs the shock of a toe, ankle or foot hitting it and is resilient. Alternative flexible and hardwearing materials are also contemplated.

In addition to padding, embodiments of the present invention also include LED or other lights attached to, or embedded in, the padding. The light(s) may be on a string of lights, or may be stand-alone. The lights may be interconnected with a motion sensor, so that the lights are off normally, but light up when movement is detected. Thus, when a person gets out of bed, their motion is detected and the light turns on. The motion detector may include a timer so that if no motion is detected for a set period of time, the light(s) turn off.

In a further embodiment, the lights may be on continuously until turned off by the user. Or may have a light/dark sensor affiliated with it such that the lights go on when the room gets dark, and turn off when the room becomes light. The lights may be turned on at a steady brightness, or may flash or have other lighting pattern, as desired. Typically, the lights are powered with a battery that is removable and can be replaced when necessary. Alternatively, the lights may be plugged into a wall or other power source.

The padding may take various forms. In one embodiment, the padding is a sleeve that wraps around the leg. The pad may have a fastener mechanism, such as Velcro, a strap, or other fastening mechanism known in the art. In another embodiment, it is a pad that has an opening such that it may be placed against the leg, with the leg extending through the opening. This may include, for example, an indentation in the pad that accommodates the leg. In another embodiment, the pad is in the shape of a sports ball, such as a football, baseball, soccer ball, or other decorative ball. In other embodiments, the pad may be the shape of an animated character, a doll, a monster, or the like. In still other embodiments, the pad may be a representation of a work of art, such as of a statue or other artwork.

In one embodiment the protective sleeve/cover can be pre-designed to fit a standard sized foot of a piece of furniture (e.g., a metal bed frame with or without wheels). The material can be of a sufficient thickness, density, and resilience to provide ample padding and impact resistance to protect a user of the furniture from injury if their foot comes in contact with the foot/leg of the furniture. For example, in one embodiment a 0.1-4" inch thickness polyurethane foam material is used to provide a cylindrically-shaped protective cover/sleeve having an interior cavity to accommodate the furniture foot. In this example, the protective cover/sleeve can be slipped onto leg/foot of furniture; encircling the furniture leg/foot. A complete range of sizes, hardness/ flexibility of material, and/or colors and designs of the polyurethane foam material are contemplated depending on the application and furniture leg to be housed in the protective cover/sleeve.

The protective cover/sleeve can be configured to cover a variety of alternative furniture leg/feet sizes and configurations including, but not limited to, a wheel caster or a flat foot support of a metal bed. As will be further discussed below, the protective/sleeve cover in a preferred embodiment can be cylindrical in shape to slip over and/or wrap around the furniture leg and/or foot to substantially cover the leg and/or foot and protect a furniture user's feet from contact.

In still another embodiment, the pad may be inflatable, with a single or multiple inflatable chambers. The pad may be made of any inflatable material, such that the inflated pad absorbs the shock of a toe, foot, ankle or the like hitting it. In one alternative embodiment the protective cover/sleeve can also have a base portion whereby said base and said side portions define a unitary construction for receiving the furniture leg. In use the cylindrical protective cover/sleeve can be slipped into place prior to inflation and then chambers inflated once the furniture leg is inserted into the interior cavity defined by the sleeve.

The protective sleeve/cover can be made from a molded, fully integrated rectangular form. The rectangular form can otherwise be produced and assembled from individual pieces and sewn together to make the desired configuration. A variety of fastening means to hold the protective cover in place include, but are not limited to, hooks and eye fasteners, ties, snaps, straps, and the like. Alternatively, metal stays can be integrated into the padded foam material, for example such that the side is flexible to accommodate positioning around the leg, and then forms a fitted and flexible fit once in place surrounding the leg.

The product can be made of various combinations engineered of plastic rubber, polyurethane and foam extrusions, flexibly shaped (cylindrical, rectangular, triangular, and the like) as to fit specifically around furniture legs and or feet and thus substantially cover the furniture leg and/or feet. Other features include methods and process for shape, size, design and strength/durability, and fasteners, specific for the purpose of creating the flexibly shaped product for furniture legs and feet and for maximizing foot and toe protection. The product dimensions can vary based on size of furniture legs and feet.

Considering now one specific embodiment of the present invention, a cover has an outer layer of a material 10 with a fur-like exterior. A light sensor 20 extends through an opening 110 (FIG. 3) in the outer layer such that it can sense ambient light and/or motion. The light sensor 20 may alternatively be a motion sensor, or may be both a light and a motion sensor. There may be more than one sensor, but for simplicity only one is shown in this figure.

In one embodiment, to allow the circuit to power the lights, the sensor(s) must detect both darkened ambient lighting and motion, such as when a person is walking across the room or steps down onto the floor (as in getting out of bed). As another alternative, the sensor can sense only motion and activate the lights when motion is detected. A variety of suitable sensors are available. The sensor may alternatively include, for example, a camera that senses motion and/or darkness and also provides a video that can be viewed, recorded, and the like. As a further alternative, the pad may be on a timer, such that it is active only at certain times of day.

In other embodiment, the pad may be an Internet-of-Things device, in which the pad has electronics to join a local area network, a cellular network, or the like. The user may communicate with the pad remotely via the network, and control the lighting on/off, set a timer, control blink/no blink, light color, or other variables from a remote device.

Adjacent to the outer layer is a foam layer 30 (FIG. 3) to provide cushioning when the device is secured to a furniture leg. The foam layer may alternatively be another type of padding, such as a polymer, rubber, baffling, an inflatable bladder, bubble wrap, gel, or other padding. In one embodiment, the device may be equipped with means for making a sound when the pad is impacted, such as by a human bumping into it. As a further alternative, the pad may include a layer that naturally makes sound upon impact, such as a layer of crinkled and/or bunched up Mylar metalized film or the like. The pad may have a smooth surface or, optionally, have a contoured surface. The pad may have openings, protrusions, and the like. For example, the pad may have an opening 35 into which a motion sensor may be located.

Figure 3:
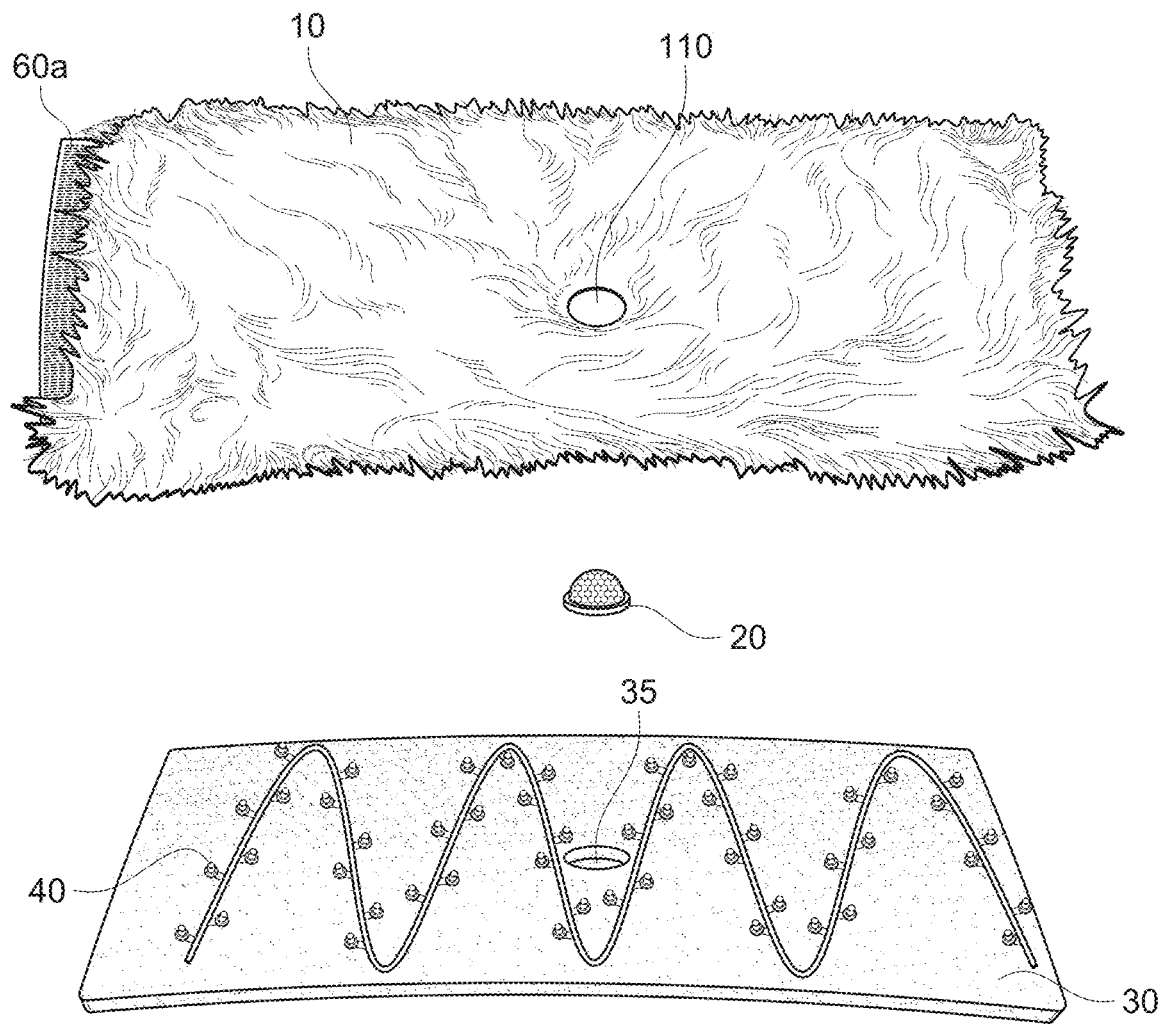
FIG. 3 illustrates a foam layer, with LED lights in between the foam layer and the outwardly-facing layer.
Figure 4:
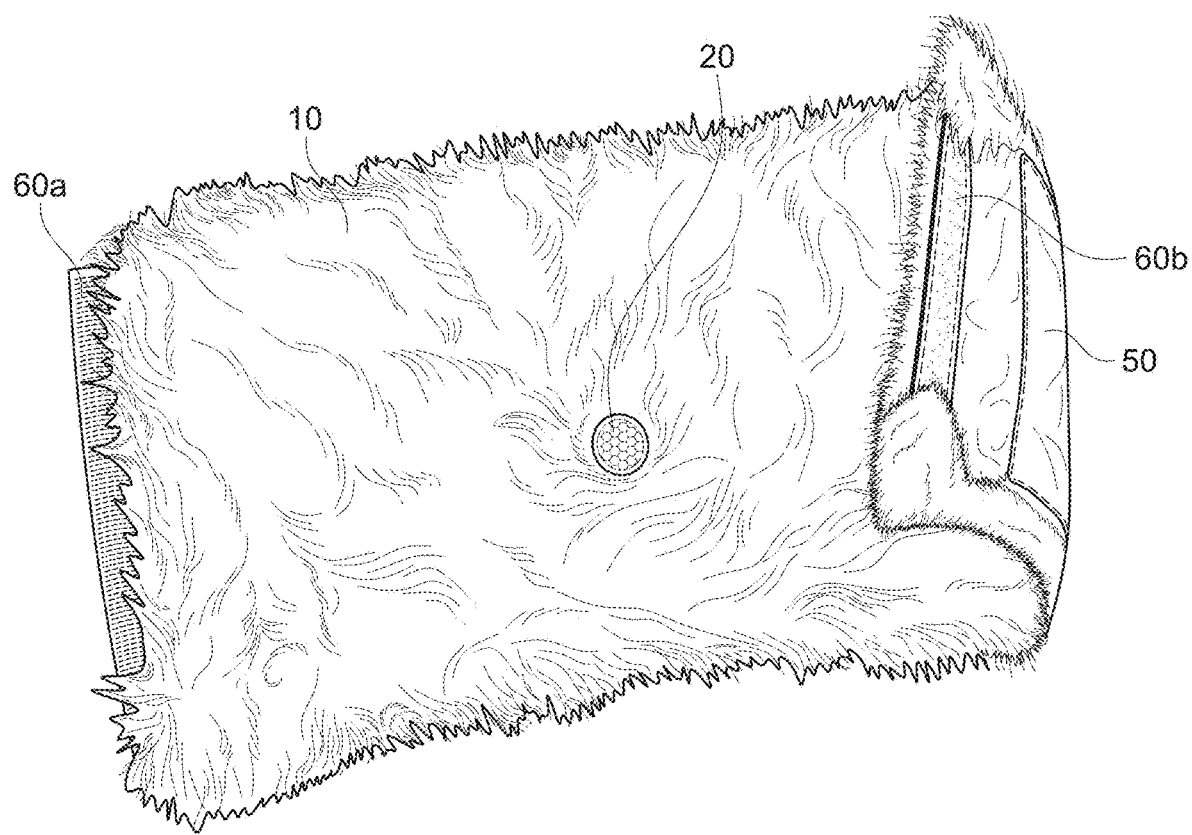
FIG. 4 illustrates one end of the embodiment of FIG. 1 having hook and loop material on securing ends.

There is an open space in between the outer layer 10 and the foam layer 30 in which lights and a battery may reside. In one embodiment, the lights are a strand of LED lights 40 (FIG. 3). The lights may be white, or other colors, depending on the effect desired. The light may optionally be provided with a circuit that causes the lights to flash, either in a uniform way or in a preprogrammed sequence, or switchable between more than one flashing or non-flashing mode. The lights may be switchable between modes, either through a physical switch on the unit or remotely as through a computer network, via Bluetooth or the like.

Figure 2:
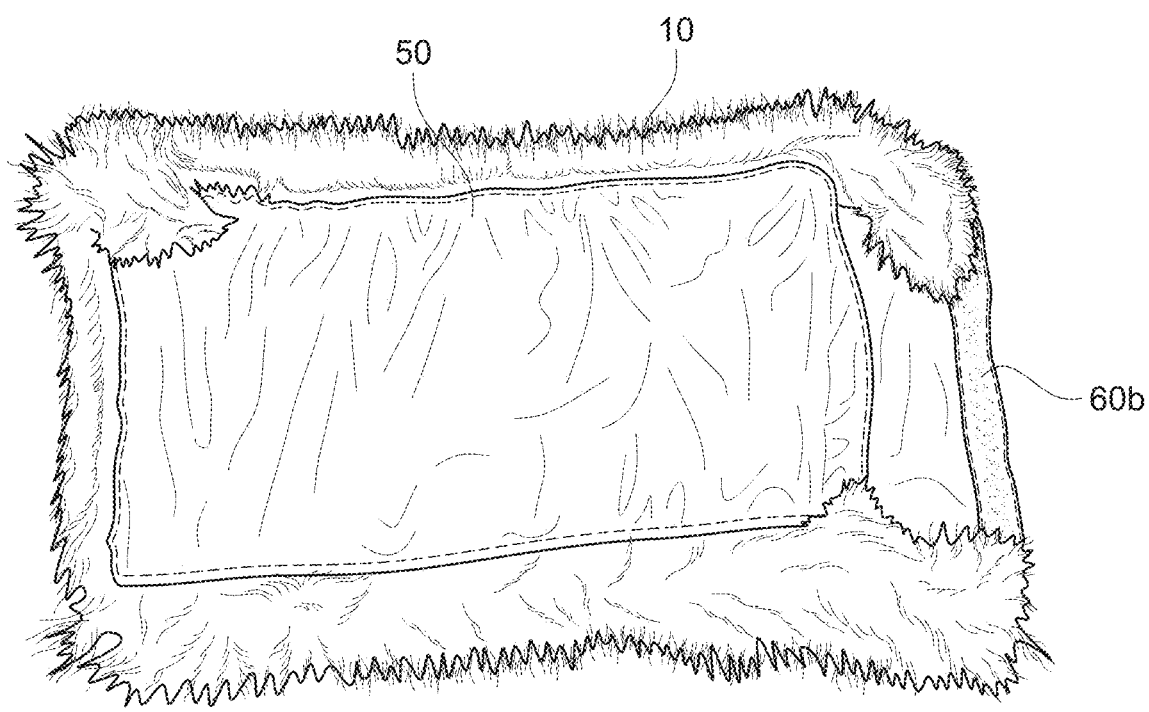
FIG. 2 illustrates an inwardly-facing surface of the embodiment of FIG. 1.
Figure 5:
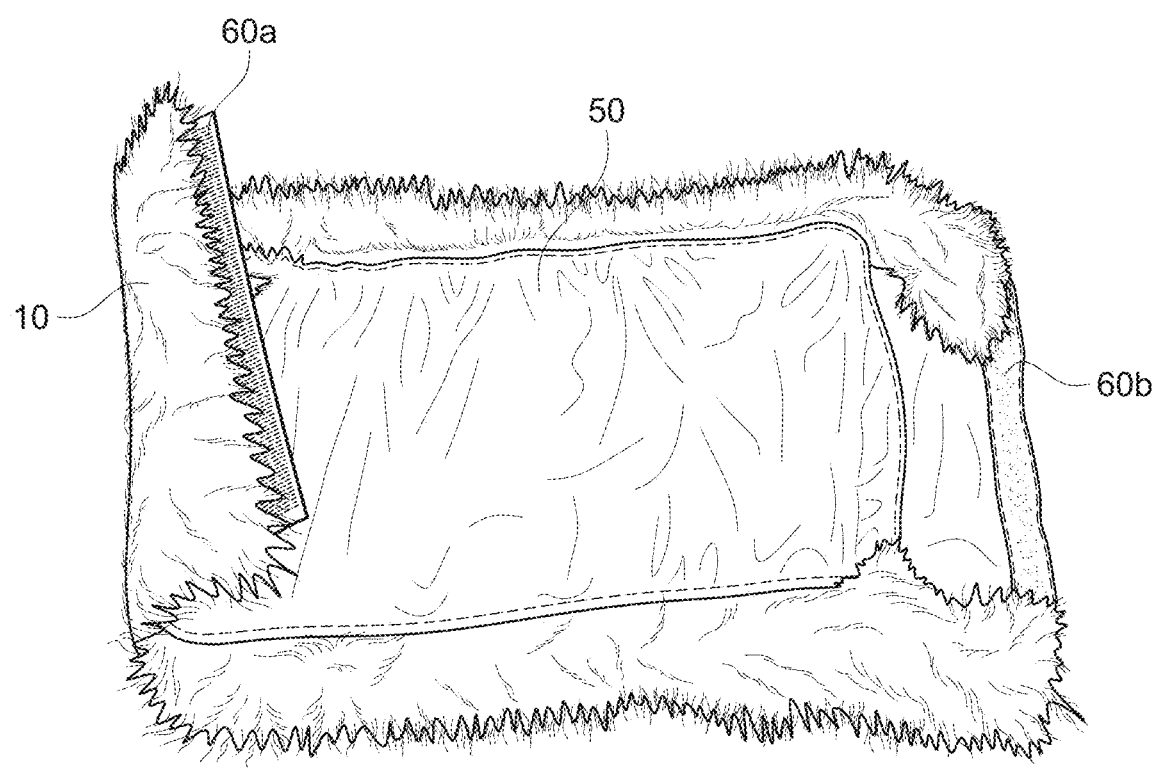
FIG. 5 illustrates the opposite end of the embodiment of FIG. 1 rolling from a flat configuration to the cylindrical configuration of FIG. 6.
Figure 6:
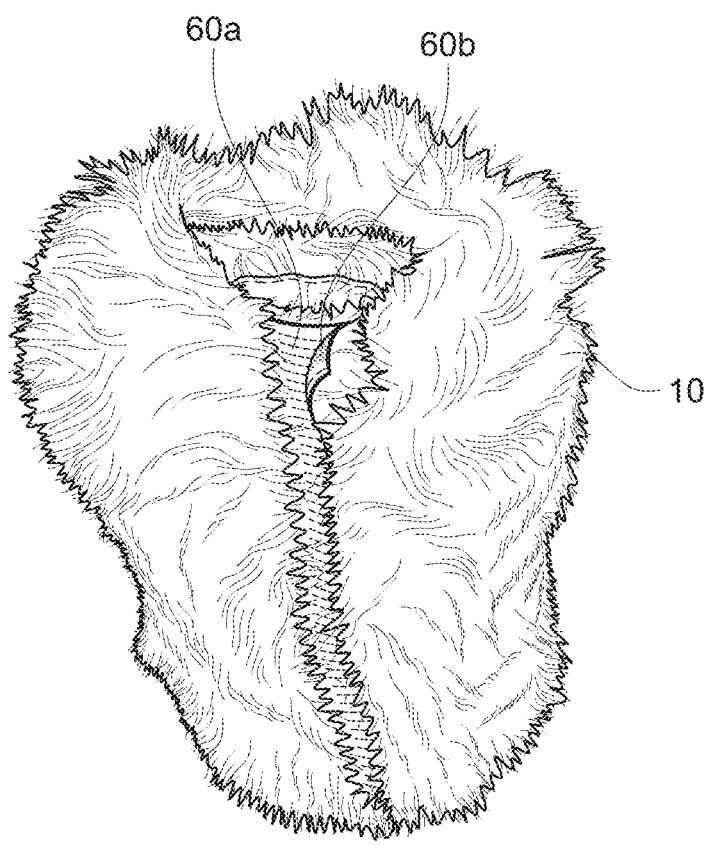
FIG. 6 illustrates the device of FIG. 1 in a cylindrical configuration when the hook-and-loop material is secured together.

A soft material backing 50 (FIG. 5) is provided along the back, furniture-facing portion of the pad. This soft material backing will contact the furniture when the device is secured to the furniture leg. The soft material backing may be made out of a soft synthetic material, cotton, or other soft material adapted to not to damage normal furniture surface materials such as polished wood, for example. In FIG. 2, the soft layer is shown sewn to the outer layer 10, for example.

Figure 7:
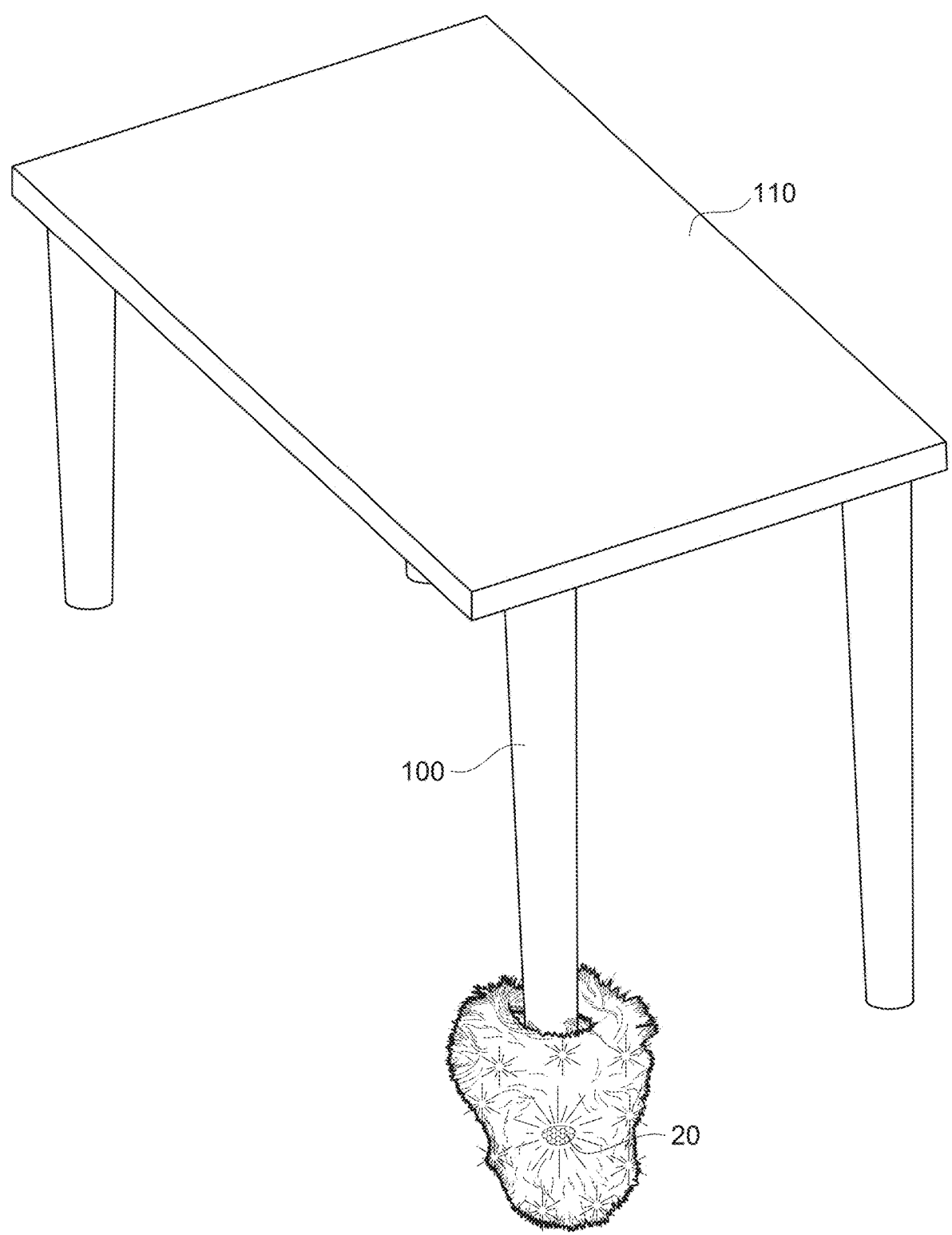
FIG. 7 illustrates the device of FIG. 1 as secured about a leg of a table.

To secure the device to a furniture leg 100 (FIG. 7) of a table 110, the user wraps the device about the furniture leg. Each end of the device may have a securing mechanism that is compatible with the securing mechanism on the opposite end, such as hook-and-loop material 60a, b, buttons, a zipper, adhesive that adheres the ends of the pad together, or the like. Other securing mechanisms suitable for this purpose and known in the art may be used.

The power source may be a battery, either rechargeable or non-rechargeable. Alternatively, the power source may be provided externally, such as plugging a power unit into an outlet. Other power sources are possible, such as an external battery in conjunction with a solar panel.

Figure 8:
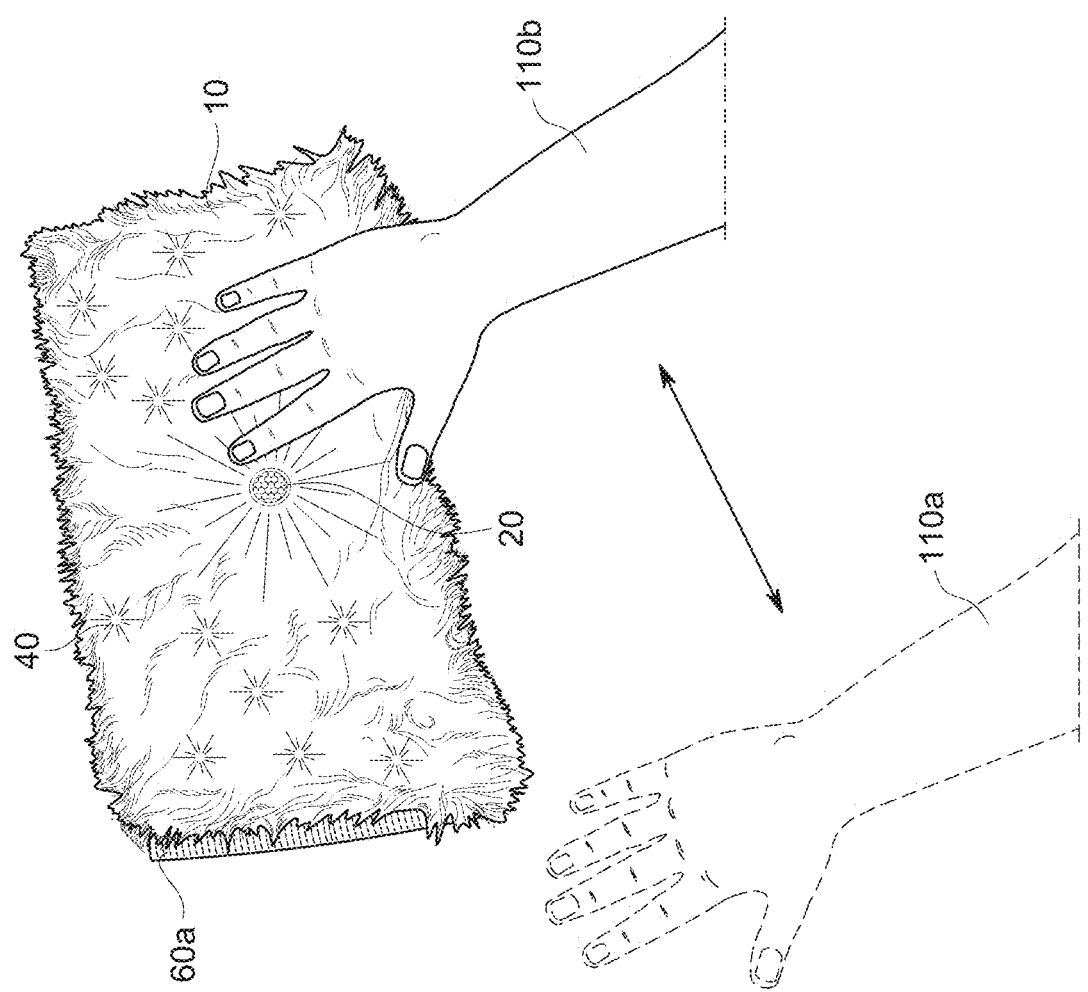
FIG. 8 illustrates the device of FIG. 1 lit up upon sensing motion.

FIG. 8 illustrates activating the light pad 10 by moving a hand 110 from a first position 110a to a second position 110b. The sensor 20 senses the motion and provides power to the lights 40, which illuminate. A circuit may be on a timer, such that motion illuminates the lights for a period of time of a few minutes or less before turning off again.

The securing mechanism may include hook and loop material, buttons and corresponding slits, adhesive, exterior bands or belt, or any of a number of suitable securing methods. As an alternative to securing the pad by connecting the ends, the pad may be secured externally, such as with straps that secure with Velcro, a buckle, or otherwise, by resilient bands, and the like. In one embodiment, the external bands are themselves lighting devices and illuminate when supplied with electrical current and/or may absorb energy from light during the day and glow when in the dark.

The pad may include electronics to connect with a wireless network, such as a local area network via Wi-Fi. The pad may also include electronics adapted for the lights to be controlled remotely.

The exterior cushioning may be foam, thick material, an inflatable bladder filled with a gas or liquid, a rubber-like material, fur, etc., and may be provided as a sheet or may be integral to the outer layer.

Figure 9:
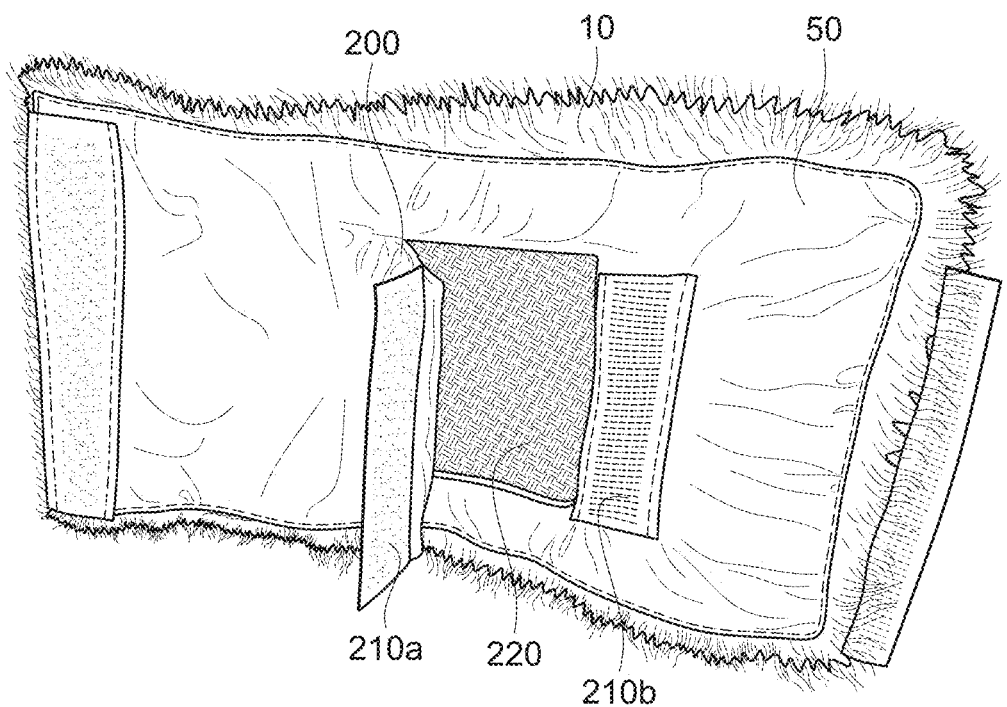
FIG. 9 illustrates an alternative embodiment that has an access panel to access the battery and/or other internal components.

FIG. 9 illustrates an alternative embodiment that has an access panel 200 to access the interior 220 of the pad. This may be desirable to access a battery on the interior to recharge or replace it, and/or to reach other electronics or components. The access panel of FIG. 9 has hook and loop material 210a, which secures to hook and loop material 210b to close the access door. The panel is typically formed from the soft layer 50. However, the panel may alternatively include part of the interior cushion, such that opening the access panel provides access to the surface of the foam layer that faces the outer layer (see the surface on which the string of lights resides, FIG. 3).

While the preferred embodiment of the invention has been illustrated and described, as noted above, many changes can be made without departing from the spirit and scope of the invention.

What is claimed is:

1. An illuminated pad for wrapping about a furniture leg, the pad comprising:
   a furry translucent outer layer that provides exterior cushioning and light diffusion;
   an inner foam cushion layer;
   a string of LED lights in between and extending along the furry outer layer and the cushion layer;
   a power source within the pad to power the lights, the power source comprising a battery;
   a light and motion sensor facing outwardly from the outer layer, the sensor adapted to cause the lights to turn on when at least one of low light level and motion are detected;
   a securing mechanism comprising hook and loop material on each end of the pad, the securing mechanism adapted to allow the pad to wrap about different sizes and shapes of furniture legs, and secure the pad about a leg of furniture; and
   a soft inner surface adapted to face a furniture leg when device is secured about the leg, the soft inner surface having an access panel that may be opened and closed to reach an interior portion of the pad,
   wherein the pad when wrapped about a furniture leg provides a diffused glow about the furniture leg when illuminated.

2. An illuminated pad as defined in claim 1, wherein the lights are adapted to flash when lit.

3. An illuminated pad as defined in claim 1, wherein the pad includes electronics to connect with a local area network.

4. An illuminated pad as defined in claim 1, wherein the pad includes electronics adapted for the lights to be controlled remotely.

5. An illuminated pad as defined in claim 1, wherein the pad includes metal stays to facilitate the pad taking on a desired shape.

6. An illuminated pad as defined in claim 1, wherein the pad has a length and the string of LED lights extends approximately the length of the pad.

7. An illuminated pad as defined in claim 1, wherein the pad is an internet-of-things device.

8. An illuminated pad for a furniture or other leg, the pad comprising:
   a translucent outer layer;
   a cushion layer;
   lights in between the outer layer and the cushion layer;

a power source interconnect to the lights to power the lights;

a sensor facing outwardly, the sensor adapted to cause the lights to illuminate when at least one of low light level and motion are detected;

a securing mechanism on each end of the pad, the securing mechanism adapted to secure the pad about a leg of furniture; and an inner surface adapted to face a furniture leg when device is secured about the leg, the inner surface having an access panel that may be opened and closed to reach an interior portion of the pad.

9. An illuminated pad as defined in claim 8, wherein the pad includes electronics to connect with a local area network.

10. An illuminated pad as defined in claim 8, wherein the pad includes electronics adapted for the lights to be controlled remotely.

11. An illuminated pad as defined in claim 8, wherein the pad includes metal stays to facilitate the pad taking on a desired shape.

12. An illuminated pad as defined in claim 8, wherein the pad has a length and the string of LED lights extends approximately the length of the pad.

13. An illuminated pad for a furniture or other leg, the pad comprising:

a padded translucent outer layer;

a cushion layer;

at least one light in between the cushion layer and the translucent outer layer;

a power source interconnected to the at least one light to illuminate the at least one light;

the at least one light being adapted to illuminate the outer layer when power is provided to the light;

a sensor adapted to cause the at least one light to illuminate when at least one of low light level and motion are detected;

a securing mechanism adapted to secure the pad about a leg of furniture;

an inner surface adapted to face a furniture leg when device is secured about the leg; and the pad having a first flat configuration when it is not secured about the leg, and a second configuration in which the pad generally conforms to a shape of the leg when it is secured about the leg; and wherein the inner surface includes an access panel that is adapted to be opened to access an interior portion of the pad.

14. An illuminated pad as defined in claim 13, wherein the pad includes electronics to connect with a local area network.

15. An illuminated pad as defined in claim 13, wherein the pad includes electronics adapted for the lights to be controlled remotely.

16. An illuminated pad as defined in claim 13, wherein the outer layer is translucent and the pad includes a string of LED lights in between the outer layer and the cushion layer.

17. An illuminated pad as defined in claim 13, wherein the pad has a length and the string of LED lights extends approximately the length of the pad.

18. An illuminated pad as defined in claim 13, wherein the outer layer is furry and strands of fur disperse light from the at least one light.

19. An illuminated pad as defined in claim 13, wherein the pad includes metal stays to facilitate the pad taking on a desired shape.

20. An illuminated pad as defined in claim 13, wherein the pad is an internet-of-things device.

\* \* \* \* \*